(12) United States Patent
Kanda

(10) Patent No.: US 8,453,069 B2
(45) Date of Patent: May 28, 2013

(54) THIN CLIENT SYSTEM, SERVER APPARATUS, CLIENT APPARATUS, AND STORAGE MEDIUM

(75) Inventor: Hirokazu Kanda, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 83 days.

(21) Appl. No.: 12/859,506

(22) Filed: Aug. 19, 2010

(65) Prior Publication Data

US 2011/0078621 A1    Mar. 31, 2011

(30) Foreign Application Priority Data

Sep. 28, 2009   (JP) .................................. 2009-223334

(51) Int. Cl.
*G06F 3/048*    (2006.01)
(52) U.S. Cl.
USPC ............................ 715/800; 715/744; 455/411
(58) Field of Classification Search
None
See application file for complete search history.

(56) References Cited

U.S. PATENT DOCUMENTS

2006/0248471 A1*  11/2006  Lindsay et al. ............... 715/800
2008/0209336 A1*   8/2008  Brown et al. ................. 715/744
2010/0233996 A1*   9/2010  Herz et al. ................... 455/411

FOREIGN PATENT DOCUMENTS

| JP | 2007-219626 | 8/2007 |
|---|---|---|
| JP | 2009-205492 | 9/2009 |
| KR | 1020050025205 A | 3/2005 |
| WO | 2008041297 | 4/2008 |

OTHER PUBLICATIONS

Japanese Office Action for Application No. 2009-223334 mailed on Oct. 11, 2011.
Korean Office Action for Korean Application No. 10-2010-0093606 mailed on Apr. 27, 2012.

\* cited by examiner

*Primary Examiner* — Boris Pesin
*Assistant Examiner* — Ayesha Huertas Torres
(74) *Attorney, Agent, or Firm* — Turocy & Watson, LLP

(57) ABSTRACT

A thin client system transmits screen data including one or more windows operated in a server apparatus to a client apparatus, and displays the screen data in the client apparatus. The system includes a list display section, a selection information transmitting section, and an active state setting section. The list display section displays, in the client apparatus, a list of window names of the windows operated in the server apparatus, in response to a list display instruction operation by the user. The selection information transmitting section transmits information that a desired window is selected, when a name of the desired window is selected by the user among the window names displayed by the list display section. The active state setting section renders a window corresponding to the information active in the server apparatus, when the information that the window is selected is transmitted by the selection information transmitting section.

6 Claims, 9 Drawing Sheets

| WINDOW ID | NAME | ACTIVE FLAG | CAPTURE FLAG | CAPTURE DATA STORING PLACE |
|---|---|---|---|---|
| 0x1234 | NEW DOCUMENT | 0 | 1 | ADDR. A |
| 0x2345 | FILE W | 0 | 0 | ADDR. B |
| 0x3456 | TODAY'S NEWS | 1 | 0 | ADDR. C |
| 0x4567 | SPORTS | 0 | 1 | ADDR. D |
| 0x5678 | HOME | 0 | 0 | ADDR. E |

24A

US 8,453,069 B2

THIN CLIENT SYSTEM, SERVER APPARATUS, CLIENT APPARATUS, AND STORAGE MEDIUM

CROSS-REFERENCE TO RELATED APPLICATION

This application is based upon and claims the benefit of priority from prior Japanese Patent Application No. 2009-223334, filed on Sep. 28, 2009, the entire contents of which are incorporated herein by reference.

BACKGROUND OF THE INVENTION

1. Field

This invention relates to a server client system, in particular, a thin client system, a server apparatus and a client apparatus in the thin client system, and a computer-readable medium which includes a program executed by a computer of the server apparatus and a computer of the client apparatus.

2. Description of the Related Art

In server client systems, thin client systems have attracted considerable attention as a leading measure against leakage of information. In thin client systems, client apparatuses are equipped with no HDDs but equipped with the minimum functions such as screen display and input, and all the important data are stored in the server apparatus. In addition, thin client systems have a merit that the server apparatus performs centralized management, and thereby operation management works such as upgrading and patch application of software can be reduced, which leads to reduction in the operation cost.

In such client systems, as disclosed in Jpn. Pat. Appln. KOKAI Pub. No. 2007-219626, signals from keys and pointer devices corresponding to user operations of client apparatuses are transmitted to the server apparatus each time a signal is generated, the server apparatus executes processing in accordance with the transmitted signal, generates screen data being a result of the processing, and transmits the data as drawing data to the client apparatus each time screen data is generated, and the client apparatus forms a display picture.

In thin client systems, a multi-window system is often adopted as a window system which operates in the server apparatus, like common personal computers.

When a plurality of windows are operated in the server apparatus, to operate a desired window in the client apparatus, it is necessary to operate the window after the window is rendered active, as in ordinary window systems. In addition, it is possible to use task bars and panels provided by the system. Regardless, picture transmission from the server apparatus to the client apparatus frequently occurs in the process of the operation. Therefore, in an environment in which delays occur, such as in wireless LANs and mobile phone networks, delays in processing occur when windows are switched, and the client system becomes difficult to use for the users.

BRIEF SUMMARY OF THE INVENTION

The present invention has been made in view of the above points, and the object of the invention is to provide a thin client system, a server apparatus, a client apparatus and a computer-readable medium including a program, which can reduce the delay in processing when windows are switched.

According to a first aspect of embodiments, there is provided a thin client system which includes a server apparatus and a client apparatus, transmits screen data including one or more windows operated in the server apparatus to the client apparatus, and displays the screen data in the client apparatus, comprising:

a list display section which displays, in the client apparatus, a list of window names of the windows operated in the server apparatus, in response to a list display instruction operation by the user;

a selection information transmitting section which transmits information that a desired window is selected, when a name of the desired window is selected by the user among the window names displayed by the list display section; and an active state setting section which renders a window corresponding to the information active in the server apparatus, when the information that the window is selected is transmitted by the selection information transmitting section.

According to a second aspect of embodiments, there is provided a server apparatus in a thin client system which includes the server apparatus and a client apparatus, transmits screen data including one or more windows operated in the server apparatus to the client apparatus, and displays the screen data in the client apparatus, comprising:

a processor which performs the following:

detecting whether there is any change in the windows operated in the server apparatus; transmitting information indicating details of a detected window change to the client apparatus, in accordance with the detected window change; and rendering a window, which corresponds to information that a window is selected, active, the information being transmitted from the client apparatus.

According to a third aspect of embodiments, there is provided a client apparatus in a thin client system which includes a server apparatus and the client apparatus, transmits screen data including one or more windows operated in the server apparatus to the client apparatus, and displays the screen data in the client apparatus, comprising:

a memory which stores information of the windows operated in the server apparatus; and a processor which performs the following:

updating storage contents of the memory, based on information transmitted from the server apparatus and indicating details of change in accordance with a window change;

displaying a list of window names of the windows operated in the server apparatus, in response to a list display instruction operation by the user; and transmitting information that a desired window is selected, when a name of the desired window is selected by the user among the displayed window names.

According to a forth aspect of embodiments, there is provided a computer-readable medium which stores a software program, the software program being executed by a computer of a server apparatus and including a series of commands to cause the computer to execute processing including the following:

detecting whether there is any change in windows operated in the server apparatus;

transmitting information indicating details of a detected window change to a client apparatus, in accordance with the detected window change; and rendering a window, which corresponds to information that a window is selected, active, the information being transmitted from the client apparatus.

According to a fifth aspect of embodiments, there is provided a computer-readable medium which stores a software program, the software program being executed by a computer of a client apparatus having a memory storing information of windows operated in a server apparatus, and including a series of commands to cause the computer to execute processing including the following:

updating storage contents of the memory, based on information transmitted from the server apparatus and indicating details of change in accordance with a window change;

displaying a list of window names of the windows operated in the server apparatus, based on the information stored in the memory, in response to a list display instruction operation by the user; and transmitting information that a desired window is selected, when a name of the desired window is selected by the user among the displayed window names.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a embodiment of the invention, and together with the general description given above and the detailed description of the embodiment given below, serve to explain the principles of the invention.

DETAILED DESCRIPTION OF THE INVENTION

An embodiment for carrying out the present invention will now be described below with reference to the drawings.

Figure 1A:
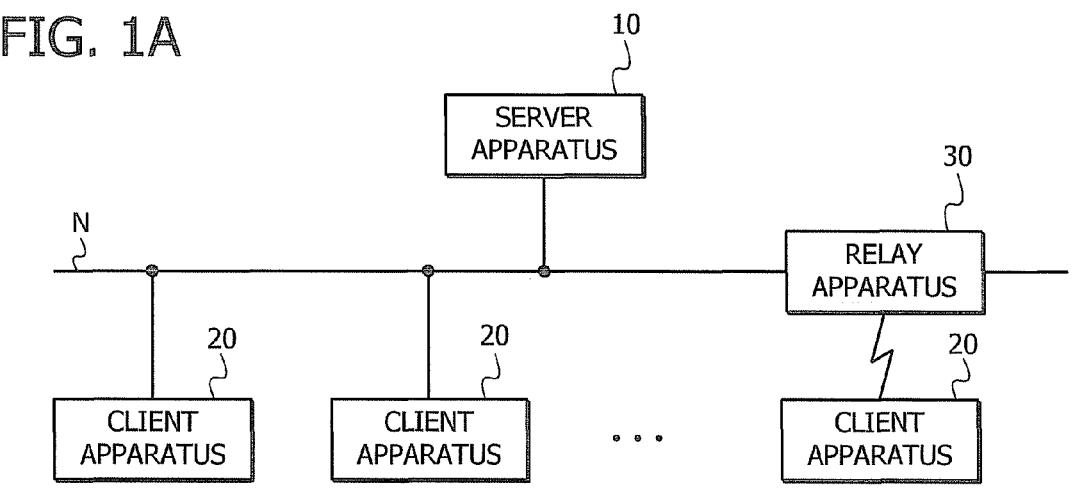
FIG. 1A is a diagram illustrating an example of a network configuration of a thin client system according to an embodiment of the present invention.

FIG. 1A is a diagram illustrating an example of a network configuration of a thin client system according to an embodiment of the present invention.

The thin client system includes a server apparatus 10 and a plurality of client apparatuses 20, which are connected to a network N formed of a LAN (Local Area Network) or a WAN (Wide Area Network). Various types of terminals can be used as the client apparatuses 20, such as desktop computers, laptop computers, notebook computers, and mobile terminals. In addition, a relay apparatus 30 having a radio function is provided on the network N, and the client apparatuses 20 of a mobile-terminal type having a radio function, such as smart phones and mobile phones, are connected to the network N through the relay apparatus 30.

Figure 1B:
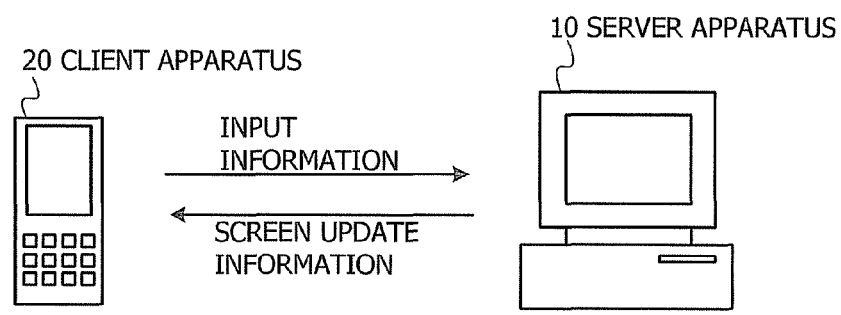
FIG. 1B is a diagram illustrating an example of a structure of the thin client system according to the embodiment.

FIG. 1B is a diagram illustrating an example of a structure of the thin client system according to the embodiment.

In the thin client system, a desired application program is started and executed in the server apparatus 10, by remote operation from each client apparatus 20. Input information such as key output signals and mouse output signals corresponding to the user operation of each client apparatus 20 is transmitted as input operation data (event signal) to the server apparatus 10 each time input information is generated. Then, the server apparatus 10 performs processing by executing application programs (such as a text preparation program, a Web browser program, a spreadsheet program, and a mail processing program) by multi-windows in accordance with event signals from the client apparatus 20, transmits display screen data generated by the processing as screen update information to the client apparatus 20 each time the picture is updated, and causes a display device of the client apparatus 20 to display the screen data.

Specifically, each client apparatus 20 in the thin client system has an input function corresponding to user operations, such as a keyboard and a mouse, and a function of outputting data to the display device (also including printers in terminals of types other than the mobile terminal type), as main functions, and may not have various other application functions or any function for managing data files, which at least the server apparatus 10 has. In addition, data files which are generated by various processing started and executed by the server apparatus 10 in accordance with input operation data of operation inputs (input events) from the client apparatuses 20 are basically stored in the server apparatus 10 or storage devices, such as magnetic disks, which are connected to and managed by the server apparatus 10, for each user account or as shared files.

Figure 2:
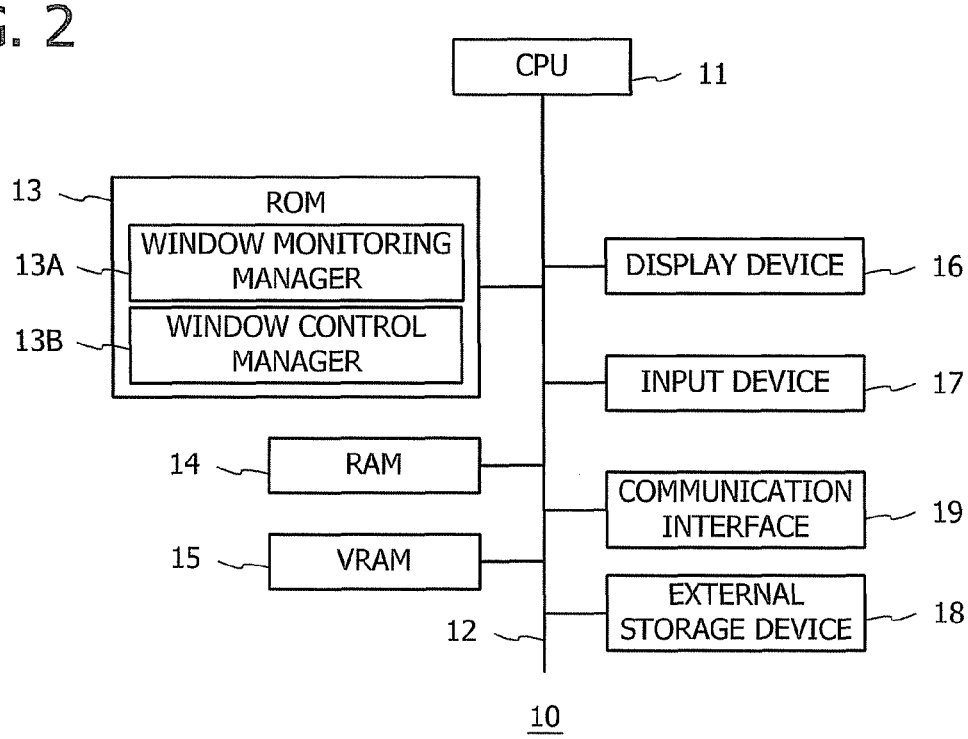
FIG. 2 is a diagram illustrating an example of a hardware structure of a server apparatus according to the embodiment of the present invention.

FIG. 2 is a block diagram illustrating an example of a hardware structure of the server apparatus 10.

The server apparatus 10 has a CPU 11. The CPU 11 is connected through a bus 12 with a ROM 13, a RAM 14, a VRAM 15, a display device 16 such as a liquid crystal display, an input device 17 such as a keyboard and a mouse, an external storage device 18, and a communication interface 19 between the server apparatus 10 and the client apparatuses 20.

The CPU 11 controls operations of various parts of the circuit, using the RAM 14 as a working memory, in accordance with a system program and various application programs stored in the ROM 13 in advance.

The various programs are started and executed, in accordance with key input signals from the input device 17, and input operation data of user operation inputs (input events) from the client apparatuses 20 received through the communication interface 19.

In the server apparatus 10, various data items generated by application programs started and executed in accordance with input operation data from the client apparatuses 20 are stored in the external storage device 18, for example, in correlation with user IDs, for example. In addition, display screen data in each client apparatus 20 is generated as an image of a display screen itself (hereinafter referred to as "image"), using a client VRAM (not shown) provided for each client apparatus 20 in the RAM 14, transmitted from the communication interface 19 to the client apparatus 20, and displayed and output in the client apparatus 20. In this case, a drawing image is compressed by the CPU 11, and thereby the transmission data quantity is reduced. In another example, the screen data is transmitted as a drawing command, such as "draw a straight line from coordinates A to coordinates Be", not a drawing image itself, and thereby the transmission data quantity can further be reduced. Screen data to be displayed by the display device 16 of the server apparatus 10 itself is generated on the VRAM 15, and displayed on the display device 16.

In addition, the ROM 13 also stores a window monitoring manager 13A, and a window control manager 13B. The window monitoring manager 13A is a program which monitors images for each client apparatus generated on the client VRAM, and obtains information concerning operated windows. The window control manager 13B is a program which performs window control in accordance with input operation data of window operation inputs (input events) in each client apparatus 20, which are obtained through the communication interface 19. The window monitoring manager 13A and the window control manager 13B have a function of performing direct communication with the client apparatuses 20. The ROM 13 can be formed of a rewritable flash memory.

Figure 3:
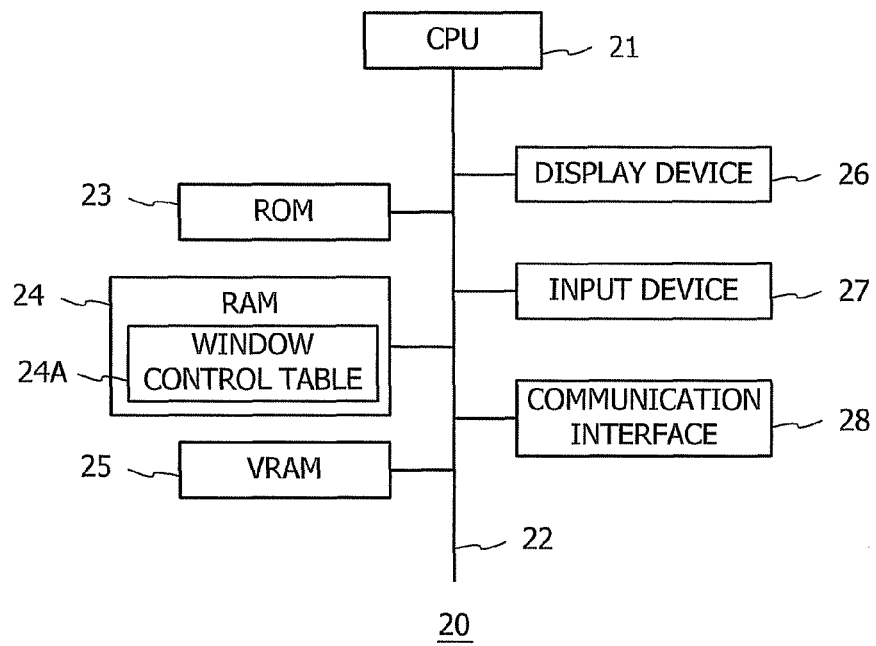
FIG. 3 is a diagram illustrating an example of a hardware structure of a client apparatus according to the embodiment of the present invention.

FIG. 3 is a block diagram illustrating an example of a hardware structure of the client apparatuses 20.

Each client apparatus 20 has a CPU 21 serving as a computer. The CPU 21 is connected through a bus 22 with a ROM 23, a RAM 24, a VRAM 25, a display device 26 such as a liquid crystal display, an input device 27 such as a keyboard and a mouse, and a communication interface 28 between the client apparatus 20 and the server apparatus 10.

The CPU 21 controls operations of various parts of the circuits, using the RAM 24 as a working memory, in accordance with a system program stored in the ROM 23 in advance. The system program is started and executed in accordance with key input signals from the input device 27, and application response signals and screen update information received from the server apparatus 10 through the communication interface 28. In the case where the client apparatuses 20 are formed as communication terminals, the communication interface 28 is formed as a communication device which performs radio communications.

Various data generated by executing application programs in the server apparatus 10 are stored in the external storage device 18 of the server apparatus 10, and transmitted to the client apparatus 20 as display screen update information, properly. Then, the various data are written in the VRAM 25 in the client apparatus 20, and displayed and output on the display device 26.

The ROM 23 also stores a program to communicate with the window monitoring manager 13A and the window control manager 13B of the server apparatus 10. The RAM 24 also stores a window control table 24A to store a window state of the server 10. The ROM 23 can be formed of a rewritable flash memory. In such a case, the window control table 24A and the like may be stored in the ROM 23.

Figures 4, 8:
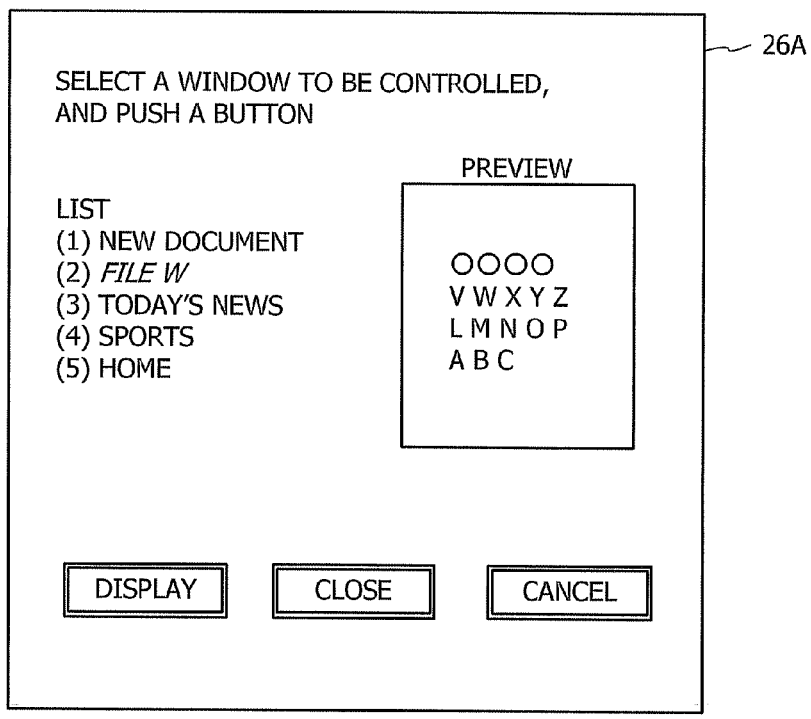
FIG. 4 is a diagram illustrating an example of a window control table which the client apparatus has.
FIG. 8 is a diagram illustrating an example of a window control dialogue when windows are controlled in the client apparatus.

FIG. 4 is a diagram illustrating an example of the window control table 24A stored in the RAM 24 (or the ROM 23 formed of a flash memory).

The window control table 24A has items "Window ID", "Name", "Active flag", "Capture flag", "Capture data storing place". The items "Window ID", "Name", and "Active flag" are set on the basis of control data (details of which are described later) transmitted from the server apparatus 10, and the items "Capture flag" and "Capture data storing place" are used for internal processing of the client apparatus 20.

The active flag is a flag which is set (set as "1") only for a window which is active at present. The capture flag is a flag which is set when the name property of a window is changed when the active flag is "0", and cleared when the window is rendered active. As the capture data storing place, an address value of the RAM 24 which stores capture data of the window is registered.

Next, operation of the thin client system having the above structure is explained below.

Operations of the server apparatus 10 and the client apparatuses 20 in a usual thin client system are not explained here, and only operations specific to the present invention will be explained.

Figure 5:
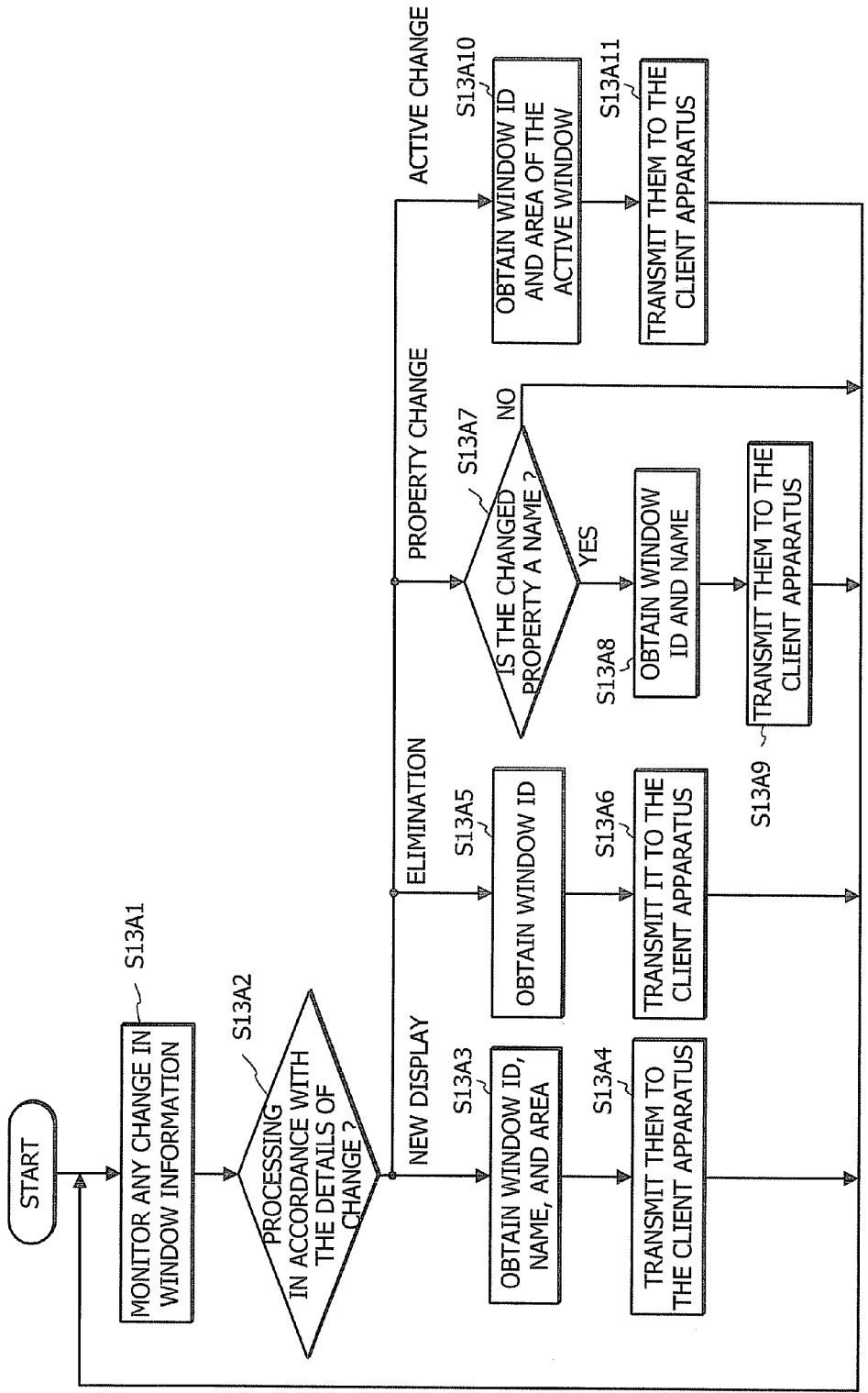
FIG. 5 is a flowchart for explaining an example of a sequence of a window monitoring manager in a program of the server apparatus according to the embodiment of the present invention.

FIG. 5 is a flowchart for explaining an example of a sequence of the window monitoring manager 13A of the server apparatus 10.

Specifically, the window monitoring manager 13A monitors an image for each client apparatus 20 generated on the client VRAM provided for each client apparatus 20 in the RAM 14, and thereby detects whether there are any changes in the operated windows (Step S13A1).

Then, when there is a change, the window monitoring manager 13A determines the details of the detected change (Step S13A2), and performs processing in accordance with the details. When there is a change in the operated window, it goes without saying that the updated image is transmitted as screen update information to the client apparatus 20 through the communication interface 19, by usual operation of the server apparatus 10.

Specifically, when a new window is displayed (new display), the window monitoring manager 13A obtains a window ID, a name, and an area (coordinates and size) of the window from the system program or the application program (Step S13A3), and transmits information thereof to the client apparatus 20 by the communication interface 19, together with control data indicating window new display (Step S13A4).

In addition, when a window is eliminated (elimination), the window monitoring manager 13A obtains a window ID of the eliminated window from the system program or the application program (Step S13A5), and transmits information thereof to the client apparatus 20 by the communication interface 19, together with control data indicating window elimination (Step S13A6).

Further, when a property of a window is changed (property change), the window monitoring manager 13A checks the details of the changed property (Step S13A7). When the name of the window is changed, the window monitoring manager 13A obtains the window ID and the name of the window from the system program or the application program (Step S13A8), and transmits information thereof to the client apparatus 20 by the communication interface 19, together with control data indicating window property change (Step S13A9). When the changed property is not the name of the window, no processing is performed.

When the active window is changed (active change), the window monitoring manager 13A obtains a window ID and an area of a window which has been rendered active from the system program or the application program (Step S13A10), and transmits information thereof to the client apparatus 20 by the communication interface 19, together with control data indicating an active window change (Step S13A11).

Figure 6A:
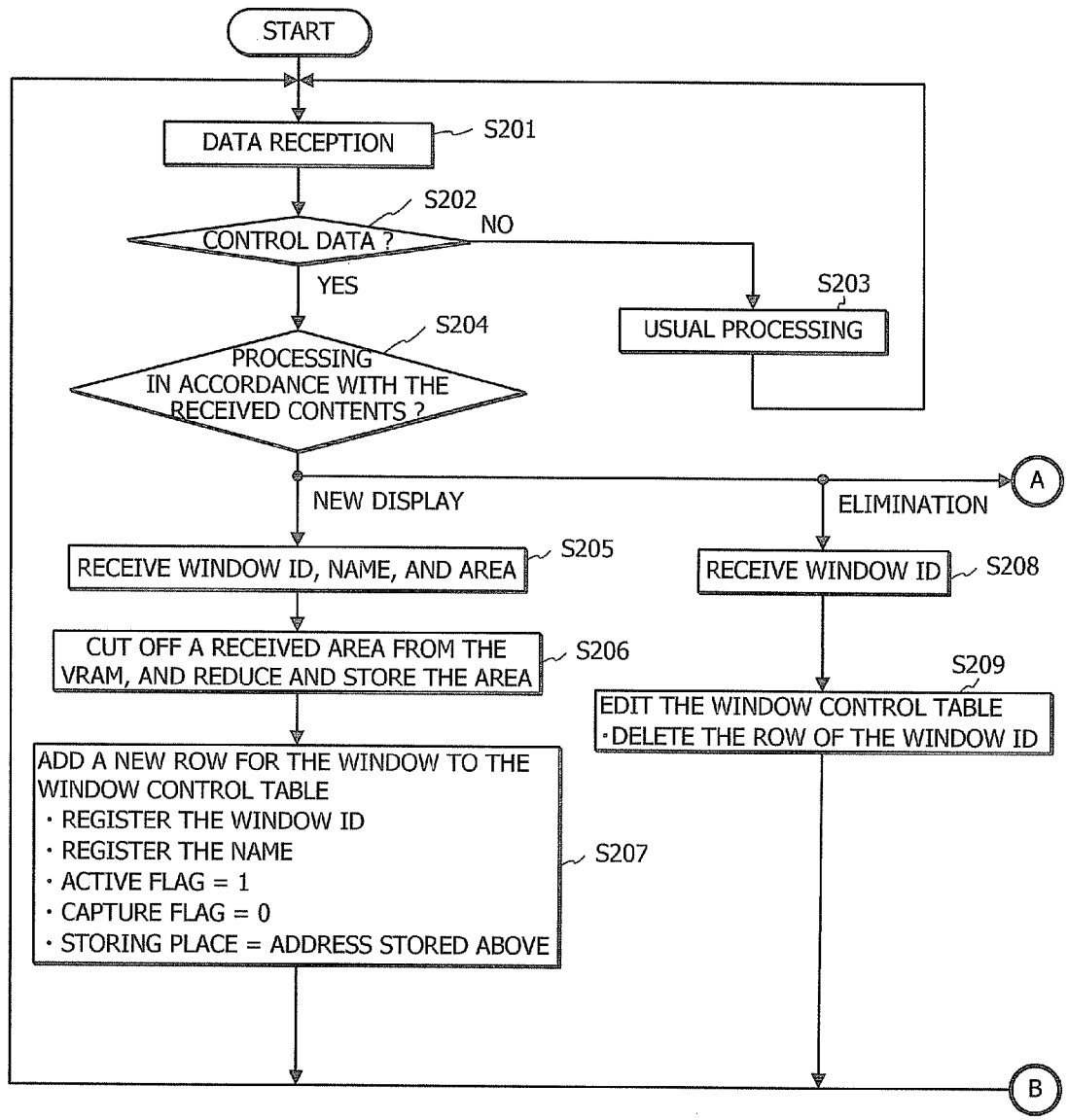
FIG. 6A is a diagram illustrating a first part of a flowchart for explaining operation in a program of the client apparatus according to the embodiment of the present invention.
Figure 6B:
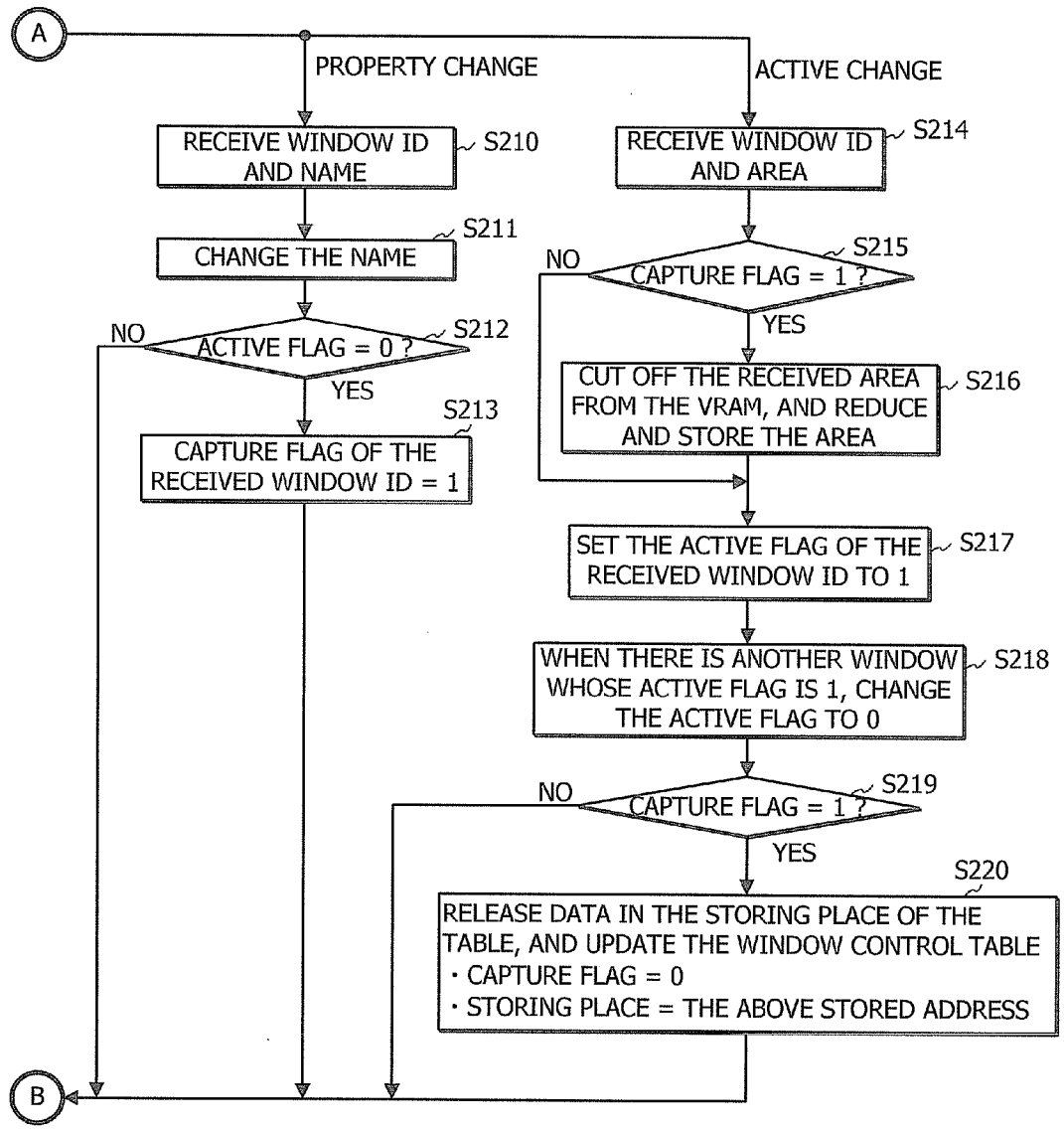
FIG. 6B is a diagram illustrating a second part of the flowchart for explaining operation in a program of the client apparatus according to the embodiment of the present invention.

FIG. 6A and FIG. 6B illustrate a flowchart for explaining operation in a program of each client apparatus 20.

In each client apparatus 20, when data from the server apparatus 10 is received by the communication interface 28 (Step S201), the client apparatus 20 determines whether the data is control data transmitted by the window monitoring manager 13A (Step S202). When the received data is not control data, that is, the received data is screen update information, the client apparatus 20 performs usual processing (Step S203).

In comparison with this, when the received data is control data, the client apparatus 20 determines the contents of the control data (Step S204), and performs processing in accordance with the contents thereof.

Specifically, when the client apparatus 20 receives control data indicating window new display, the client apparatus 20 receives the window ID, the name, and the area of the new window (Step S205). Then, the client apparatus 20 cuts off an area indicated by the received area information from an image already written on the VRAM 25 in accordance with screen update information, reduces the area to a predetermined size, and stores it as capture data on the RAM 24 (Step S206). In addition, the client apparatus 20 adds a new row to the window control table 24A, and registers items of the new window in the new row (Step S207). Specifically, the client apparatus 20 registers the received window ID in the item "Window ID", and registers the received name in the item "Name". In addition, the client apparatus 20 sets the item "Active flag" to "1", and clears the item "Capture flag" to "0". Then, the client apparatus 20 registers an address value of the RAM 24, in which the capture data is stored, in the item "Capture data storing place".

On the other hand, when the received control data indicates window elimination, the client apparatus 20 receives the window ID of the window to be eliminated (Step S208). Then, the client apparatus 20 deletes the row indicated by the received window ID, from the window control table 24A (Step S209).

When the client apparatus 20 receives control data indicating window property change, the client apparatus 20 receives a window ID and a name of the window (Step S210). Then, the client apparatus 20 newly registers the received name in the item "Name" of the row indicated by the received window ID in the window control table 24A (Step S211). Thereafter, the client apparatus 20 determines whether the item "Active flag" in the row is "0" or not (Step S212).

When the item "Active flag" is "0", the client apparatus 20 sets the item "Capture flag" to "1" (Step S213). For example, in a Web browser serving as application program, there are cases where the browser automatically moves to another Web page even when the window is not active, and the name property of the window is changed in such cases. To deal with such cases, when the window is not active, the capture flag is set at this step, such that the capture data is updated when the window is rendered active next.

In comparison with this, when the item "Active flag" is "1", since the window whose property has been changed is in an active state and an image has already been written on the VRAM 25 in accordance with screen update information, it is possible to update the capture data.

When control data indicating an active window change is received, the client apparatus 20 receives a window ID and an area of the new active window (Step S214). Then, the client apparatus 20 determines whether the item "Capture flag" of the row indicated by the received window ID in the window control table 24A is "1" or not (Step S215). When the item "Capture flag" of the row is "1", the client apparatus 20 cuts off an area indicated by the received area information from an image already written on the VRAM 25 in accordance with screen update information, reduces the area to a predetermined size, and stores it as capture data on the RAM 24 (Step S216). Then, the client apparatus sets the item "Active flag" in the row of the window control table 24A to "1" (Step S217). In comparison with this, when the item "Capture flag" is "0", the client apparatus skips the Step S216, and goes to Step S217.

Thereafter, when there is any other row corresponding to another window ID whose item "Active flag" is "1" in the window control table 24A, the client apparatus 20 clears the item to "0" (Step S218).

Then, the client apparatus 20 determines again whether the item "Capture flag" of the row indicated by the received window ID in the window control table 24A is "1" or not (Step S219). When the capture flag is 0, no processing is performed. When the capture flag is "1", the client apparatus 20 releases the capture data registered in the address value registered in the item "Capture data storing place" in the row, and then updates the registered contents of the row in the window control table 24A (Step S220). Specifically, the client apparatus registers an address value of the capture data, which has been stored at the Step S216, in the item "Capture data storing place", and clears the item "Capture flag" to "0".

As described above, when there is a change in any window operated in the server apparatus 10, the contents of the window control table 24A of the relevant client apparatus 20 are rewritten in accordance with the details of the change.

Figure 7:
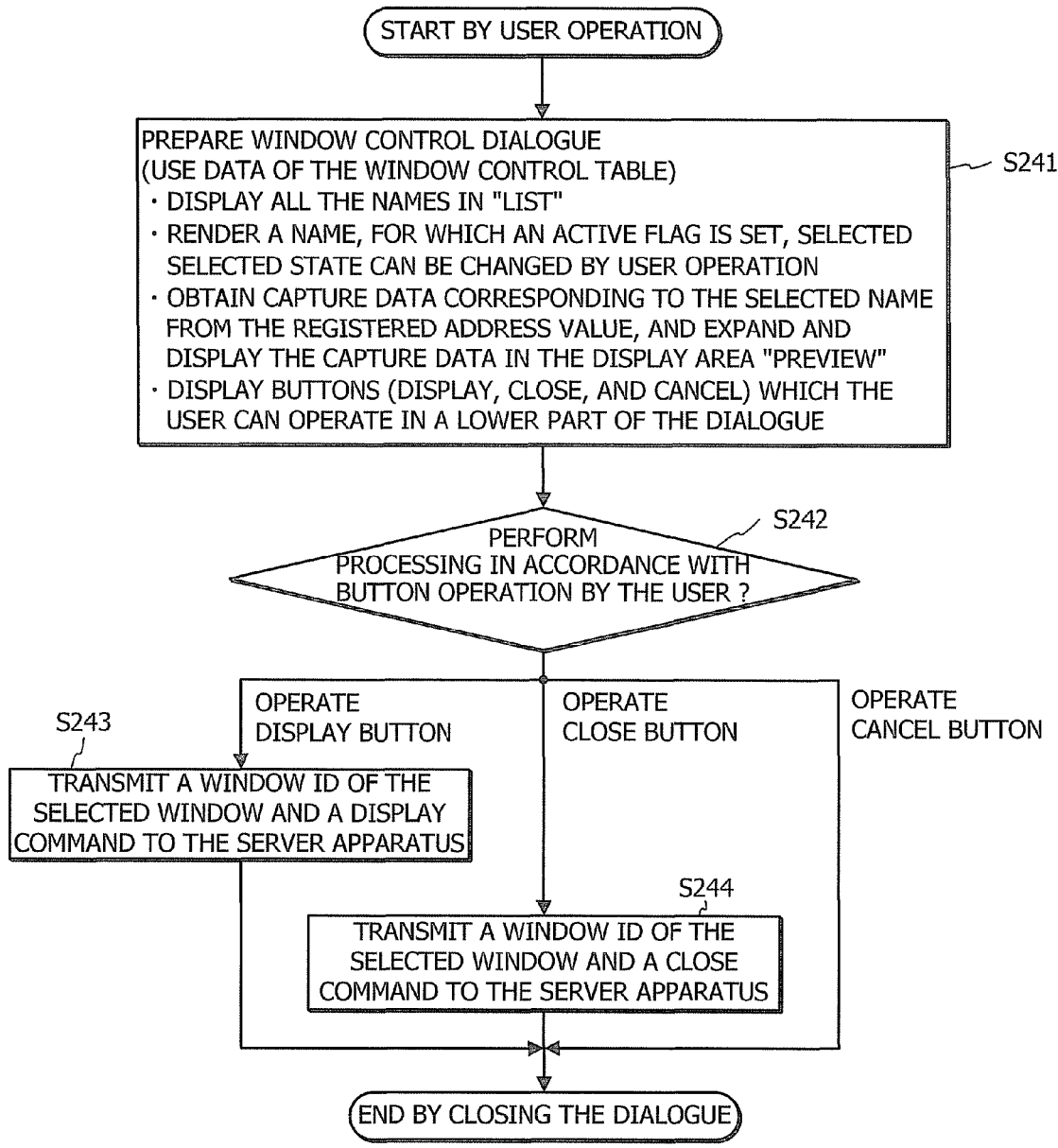
FIG. 7 is a flowchart for explaining operation relating to window control in a program of the client apparatus.

FIG. 7 is a flowchart for explaining an operation relating to window control in a program of each client apparatus 20.

When a program which realizes a window control function as illustrated in the flowchart of FIG. 7 is started by performing a predetermined user operation by the input device 17, first, the client apparatus 20 prepares a window control dialogue by using data of the window control table 24A, and displays the dialogue as a full screen image on the display device 26 (Step S241).

FIG. 8 is a diagram illustrating an example of the window control dialogue.

The window control dialogue 26A displays a list of names of the windows operated by the server apparatus 10 in the "List", on the basis of names registered in the item "Name" in the rows of the window control table 24A. In addition, the name of the window selected by the user among the displayed names, that is, the name whose "active flag" is set to "1", is set to a selected state (emphasized display), and the capture data stored in the address value described in the item "Capture data storing place" is displayed as a preview image in the area "Preview" of the window control dialogue 26A. In addition, buttons "Display", "Close" and "Cancel" are displayed as buttons which the user can operate in the lower part of the window control dialogue 26A.

In the window control dialogue 26A, the selection state of the listed names can be changed by user operation of the input device 17, and the capture data previewed in the area "Preview" is changed in accordance with the change of the selection state. Therefore, since the contents of the windows are displayed, the user can easily find a desired window, and check the contents of the windows without sending screen update information from the server apparatus 10 to the client apparatus 20.

When user operation is performed for any of the buttons "Display", "Close" and "Cancel" in the lower part of the window control dialogue 26A, the client apparatus 20 determines for which button the user operation is performed (Step S242), and performs an operation corresponding to the button.

Specifically, when the button "Display" is operated, the client apparatus 20 determines that an instruction to render the window of the name in the selected state active is issued, obtains a window ID corresponding to the selected name from the window control table 24A, and transmits the window ID together with a display command to the server apparatus 10 by the communication interface 28 (Step S243). Then, the client apparatus 20 closes the window control dialogue 26A, and ends the operation relating to the window control.

When the button "Close" is operated, the client apparatus 20 determines that an instruction to eliminate the window in the selected state is issued, obtains a window ID corresponding to the selected name from the window control table 24A, and transmits the window ID together with a close command to the server apparatus 10 by the communication interface 28 (Step S244). Then, the client apparatus 20 closes the window control dialogue 26A, and ends the operation relating to the window control.

When the button "Cancel" is operated, the client apparatus 20 performs no processing, closes the window control dialogue 26A, and ends the operation relating to the window control.

Figure 9:
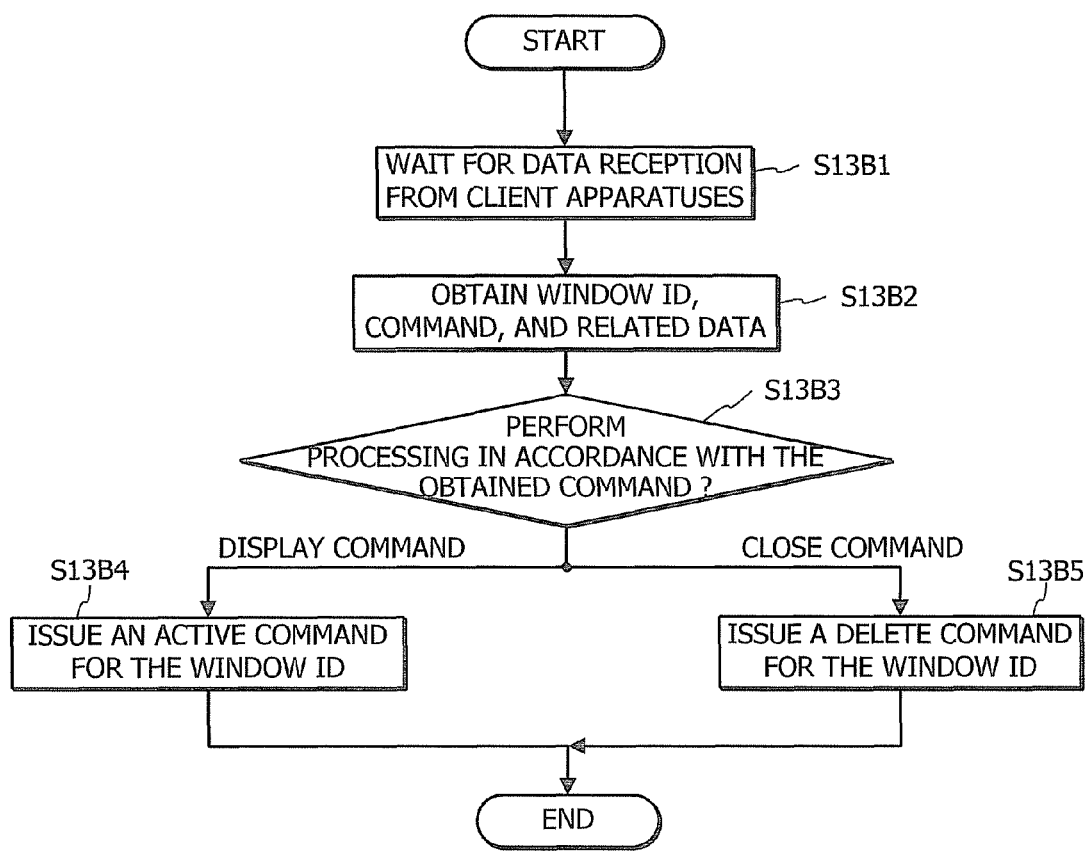
FIG. 9 is a flowchart for explaining an example of a sequence of the window control manager in a program of the server apparatus.

FIG. 9 is a flowchart for explaining an example of a sequence of the window control manager 13B in a program of the server apparatus 10.

Specifically, the window control manager 13B always waits for data reception from the client apparatuses 20 by the communication interface 18 (Step S13B1). When there is data reception, the window control manager 13B obtains a window ID, a command, and related data from the received data (Step S13B2). Then, the window control manager 13B determines the details of the obtained command (Step S13B3), and performs processing in accordance with the details. Specifically, when a display command is received, the window control manager 13B issues an active command for the window (application program) having the received window ID, and thereby renders the window active (Step S13B4). When a close command is received, the window control manager 13B issues a delete command for the window (application program) having the received window ID, and thereby eliminates the window (Step S13B5).

Since the operated window is changed by performing window control by the window control manager 13B, it goes without saying that the window monitoring manager 13A performs operation as described above by the change in the operated window, and the window control table 24A of the client apparatus 20 is updated as described above.

As described above, according to the present embodiment, in a thin client system, information necessary for window recognition is transmitted from the server apparatus 10 to the client apparatuses 20 in advance, and thus operation can be performed without new communications when the user wishes to operate the windows. This structure enables the users to easily control windows with high responsibility.

In addition, the information necessary for window recognition is automatically detected and updated each time there is preparation of a new window, elimination of a window, or change in the name property of a window in the server apparatus 10. Therefore, the states of windows operated in the server apparatus 10 can always be understood by each client apparatus 20.

Further, since part of the transmitted image is stored as capture data, and the capture data is displayed as preview image when a window to be controlled is selected, there is the advantage that the user can easily understand visually which window is the window to be controlled, and the frequency of performing erroneous operation is decreased.

In addition, when the name property of an inactive window is changed, data of the window area is captured when the window is rendered active, and thus capture data closer to the latest window state can be obtained.

Further, since the present embodiment does not depend on a specific application program, there is the advantage that the embodiment is applicable to existing application programs.

In addition, since the window control dialogue 26A which displays a list of names of windows operated in the server apparatus is displayed as full-screen image on the display device 26, the list can be recognized with good viewability, and the user can easily select a desired window even in client apparatus 20 of a mobile terminal type having a small display screen.

The above methods of processing by the thin client system described in the above embodiment, that is, methods such as the processing by the server apparatus 10 illustrated in the flowcharts of FIG. 5 and FIG. 9, and the processing by the client apparatuses 20 illustrated in the flowcharts of FIG. 6A, FIG. 6B and FIG. 7 can be stored and distributed, as programs which can be executed by computers, in storage media of external storage devices such as memory cards (ROM cards and RAM cards), magnetic disks (floppy disks and hard disks), optical disks (CD-ROMs and DVDs), and semiconductor memories. Then, the computers (CPU 11 and CPU 21) of the server apparatus 10 and the client apparatuses 20 can read the programs stored in the storage media of external storage devices into the RAM 14 and RAM 24, and can realize the functions explained in the above embodiment and carry out the same processing as the above methods, by controlling an operation by the read programs.

In addition, data of the programs to realize the above methods can be transmitted in the form of a program code on the network N. The above functions can be realized also by taking the program data from a computer apparatus (program server) connected to the network N, storing the program data in the ROM (flash memory) and reading it into the RAM 14 and the RAM 24, or taking and storing the program data directly in the RAM 14 and RAM 24.

Although the above embodiment is explained with an example of a thin client system, the embodiment is also applicable to ordinary server client systems.

In addition, although in the above embodiment each of the window monitoring manager 13A and the window control manager 13B is software which operates independently, they can be included in other software, as functions to be added to a window manager which controls an arrangement of windows and task bar display.

Further, the window control commands in the above embodiment only include commands to render a target window active and eliminate a target window, and any commands can be included, such as commands to render a window inactive, maximize, minimize, and iconify a window, as long as they are commands to operate a window.

In addition, although only the name property is used among window properties in the above embodiment, any properties such as icons, icon names, and application names can be used, as long as it is useful for the user's recognition of the windows. These properties are collectively referred to as "window names".

Further, although only capture data of the selected window is displayed in the window control dialogue 26A in the above embodiment, all the capture data items may be displayed, or may not be displayed.

Figure 10:
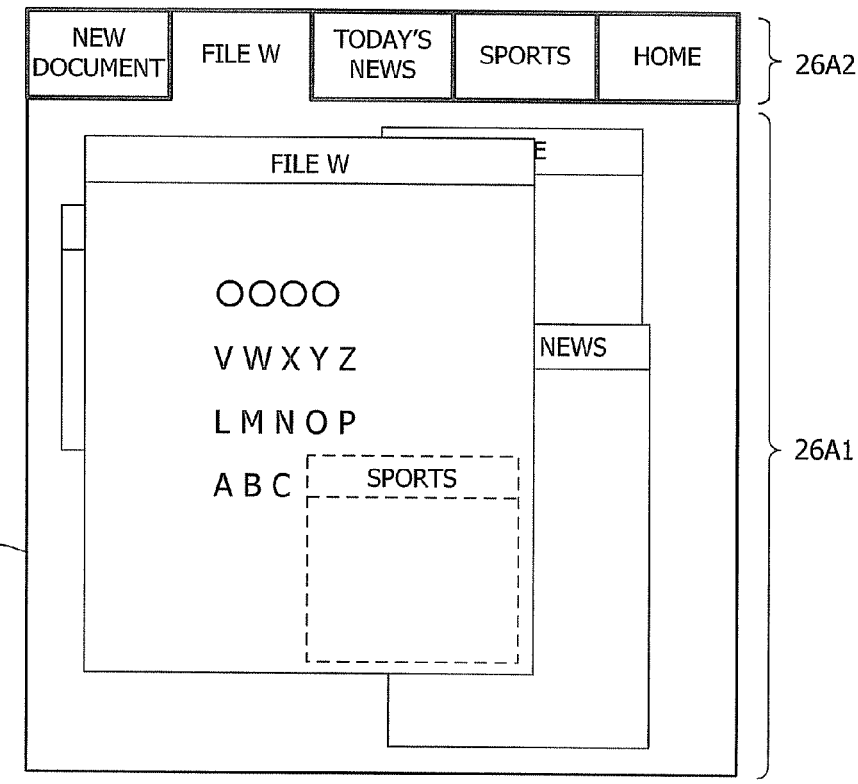
FIG. 10 is a diagram illustrating another example of the window control dialogue when windows are controlled in the client apparatus.

For example, FIG. 10 is a diagram illustrating another example of the window control dialogue 26A when window control is performed in the client apparatus 20.

In this window control dialogue 26A, images formed by screen update information transmitted from the server apparatus 10 are displayed as they are in a screen image area 26A1, and names of windows operated in the server apparatus 10 are listed in the form of tabs in a window list area 26A2 located above the screen image area 26A1, on the basis of names registered in the item "Name" in the rows of the window control table 24A.

A window indicated by broken lines in the screen image area 26A1 is a window, the whole of which is hidden under another window.

According to the window control dialogue 26A of this example, the relation between windows operated in the server apparatus 10 can be easily understood, without occurrence of new communications from the server apparatus 10.

In this case, no capture data is used. As an instruction to select a window name in the window list area 26A2, that is, to render a window active, the client apparatus 20 obtains a window ID corresponding to the name from the window control table 24A, and transmits the window ID together with a display command by the communication interface 28 to the server apparatus 10.

Elimination of a window is executed by actual elimination operation input in the window which is rendered active.

Figure 11:
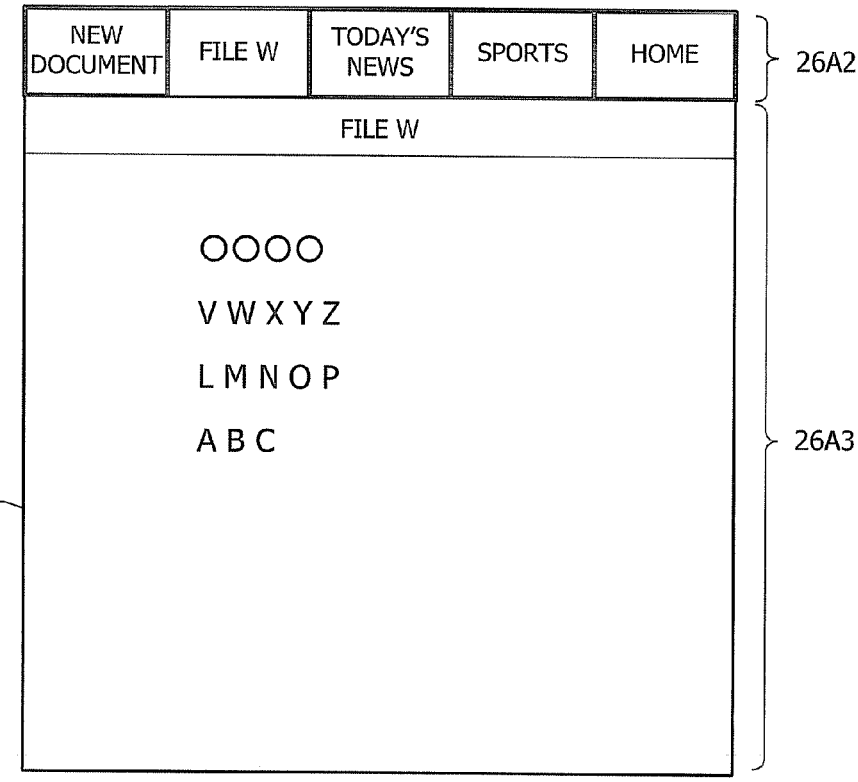
FIG. 11 is a diagram illustrating another example of the window control dialogue when windows are controlled in the client apparatus.

FIG. 11 is a diagram illustrating another example of the window control dialogue 26A when window control is performed in each client apparatus 20.

In this window control dialogue 26A, names of windows operated in the server apparatus 10 are displayed as a list in the form of tabs in the window list area 26A2 located in an upper part of the window control dialogue 26A, on the basis of the names registered in the item "Name" in the rows of the window control table 24A. In addition, capture data of the window of the selected name, which is stored in the RAM 24 and whose address value is indicated in the item "Capture data storing place", is displayed in an enlarged state in a preview area 26A3.

According to the window control dialogue 26A of this example, the contents of windows operated in the server apparatus 10 can be easily understood, without occurrence of new communications from the server apparatus 10.

Although the above embodiment has the structure in which data capturing is performed when the name property of a window is changed and the window is rendered active, another method can be used, if there is a method of detecting that the target window is greatly changed.

Although the above embodiment has the structure in which preview data is prepared in the client apparatus 20, the preview data may be prepared by the window monitoring manager 13A or the application program of the window, and transmitted to the client apparatus 20, when the window monitoring manager 13A in the server apparatus 10 detects a change in the operated window. In such a case, when the window control dialogue as illustrated in FIG. 8 is used, preview data can be prepared by reducing the image to the predetermined size in line with the area "Preview". In addition, when the window control dialogue 26A as illustrated in FIG. 11 is used, preview data can be prepared by resizing the image in line with the size of the display device 26 of the client apparatus 20 recognized in advance.

The present invention is not limited to the above embodiment, but can be variously modified when carried out within a range not departing from the gist of the invention. In addition, the above embodiment includes inventions of various stages, and various inventions can be extracted by proper combinations of a plurality of constituent elements disclosed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A thin client system which includes a server apparatus and a client apparatus, transmits a screen including a plurality of windows operated in the server apparatus to the client apparatus, and displays the screen in the client apparatus, comprising:
    a window display section which receives screen information of each window operated and displayed in the server apparatus to display the screen information of the each window in the client apparatus;
    a storage section which acquires control information including window names identifying the windows upon receipt of the screen information of the each window and stores the control information and scaled-down capture images showing the screen information of the each window in scaled-down size, in the client apparatus;
    a list display section which reads out window names of the windows operated in the server apparatus from the storage section and displays a list of window names of the windows operated in the server apparatus in the client apparatus, in response to a list display instruction operation by the user in the client apparatus;
    a preview display section which, at each time when a name of the desired window is selected by the user among the window names displayed by the list display section, reads out a scaled-down capture image of a window corresponding to the name of the desired window and displays a preview of the scaled-down capture image in the client apparatus; and
    a transmitting section which, if a window corresponding to the selected window name in the preview display section is required, transmits information from the client apparatus to the server apparatus, the information requiring an updated window screen corresponding to the selected window name.

2. The thin client system according to claim 1, further comprising:
    a new window name transmitting section which transmits a window name of a new window displayed in the server apparatus from the server apparatus to the client apparatus, when the new window is displayed in the server apparatus; and
    an eliminated window specifying information transmitting section which transmits information specifying a window eliminated in the server apparatus from the server apparatus to the client apparatus, when the window is eliminated in the server apparatus,
    wherein the list display section updates contents of the list, when the window name of the new window is transmitted by the transmitting section, or when the information specifying the eliminated window is transmitted by the eliminated window specifying information transmitting section.

3. The thin client system according to claim 1, further comprising:
a changed window name transmitting section which transmits a window name changed in the server apparatus from the server apparatus to the client apparatus, when the window name is changed in the server apparatus,
wherein the list display section updates the list based on the changed window name, when the changed window name is transmitted by the changed window name transmitting section.

4. The thin client system according to claim 1, further comprising:
a display section which receives, from the server apparatus, the window screen activated in response to the requirement from the transmitting section and displays the window screen as the updated window screen in the client apparatus; and
a replacement section which replaces, in the client apparatus, the scaled-down capture image corresponding to the selected window with an updated scaled-down capture image corresponding to the updated window screen.

5. A method for transmitting a screen including a plurality of windows operated in a server apparatus to a client apparatus, and displaying the screen on the client apparatus, comprising:
receiving, by a system including a processor, screen information of each window operated and displayed in the server apparatus to display the screen information of the each window in the client apparatus;
acquiring, by the system, control information including window names identifying the windows upon receipt of the screen information of the each window and storing the control information and scaled-down capture images showing the screen information of the each window in scaled-down size, in the client apparatus;
reading out, by the system, window names of the windows operated in the server apparatus from the control information and the scaled-down capture image and displaying a list of window names of the windows operated in the server apparatus on the client apparatus, in response to a list display instruction operation by the user on the client apparatus;
for each time when a name of the desired window is selected by the user among the list of window names, reading out, by the system, a scaled-down capture image of a window corresponding to the name of the desired window and displaying a preview of the scaled-down capture image in the client apparatus; and
in response to a selection by the user of a window corresponding to the selected window name, transmitting, by the system, information from the client apparatus to the server apparatus, the information requiring an updated window screen corresponding to the selected window name.

6. A non-transitory computer readable storage medium having computer-readable instructions that, in response to execution, cause a system including at least one processor to perform operations, comprising:
receiving screen information of each window operated and displayed on a server apparatus to display the screen information of the each window on a client apparatus, wherein each window operating on the server apparatus is associated with a screen that includes a plurality of windows and the screen is displayed on the client apparatus;
acquiring control information including window names identifying the windows upon receipt of the screen information of the each window and storing the control information and scaled-down capture images showing the screen information of the each window in scaled-down size, in the client apparatus;
reading out window names of the windows operated in the server apparatus from the control information and the scaled-down capture image and displaying a list of window names of the windows operated in the server apparatus on the client apparatus, in response to a list display instruction operation by the user on the client apparatus;
for each time when a name of the desired window is selected by the user among the list of window names, reading out a scaled-down capture image of a window corresponding to the name of the desired window and displaying a preview of the scaled-down capture image in the client apparatus; and
in response to a selection by the user of a window corresponding to the selected window name, transmitting information from the client apparatus to the server apparatus, the information requiring an updated window screen corresponding to the selected window name.

* * * * *